(12) United States Patent
Wallach

(10) Patent No.: US 11,182,507 B2
(45) Date of Patent: Nov. 23, 2021

(54) DOMAIN CROSSING IN EXECUTING INSTRUCTIONS IN COMPUTER PROCESSORS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 292 days.

(21) Appl. No.: 16/520,299

(22) Filed: Jul. 23, 2019

(65) Prior Publication Data
US 2020/0074094 A1    Mar. 5, 2020

Related U.S. Application Data

(60) Provisional application No. 62/725,030, filed on Aug. 30, 2018, provisional application No. 62/724,896, filed on Aug. 30, 2018, provisional application No. 62/724,913, filed on Aug. 30, 2018, provisional application No. 62/724,929, filed on Aug. 30, 2018, provisional application No. 62/724,999, filed on Aug. 30, 2018.

(51) Int. Cl.
*G06F 21/62* (2013.01)
(52) U.S. Cl.
CPC .................. *G06F 21/629* (2013.01)
(58) Field of Classification Search
CPC .................................... G06F 21/629
USPC .......................................... 726/17
See application file for complete search history.

(56) References Cited

U.S. PATENT DOCUMENTS

| | | | |
|---|---|---|---|
| 4,386,399 A | 5/1983 | Rasala et al. | |
| 4,409,655 A | 10/1983 | Wallach et al. | |
| 4,525,780 A * | 6/1985 | Bratt .............. | G01R 31/318505 |
| | | | 711/163 |
| 4,821,184 A | 4/1989 | Clancy et al. | |
| 6,446,188 B1 | 9/2002 | Henderson et al. | |
| 7,370,193 B2 | 5/2008 | Shao et al. | |
| 8,245,270 B2 | 8/2012 | Cooperstein et al. | |

(Continued)

FOREIGN PATENT DOCUMENTS

WO    2013174503 A1    11/2013

OTHER PUBLICATIONS

Zhang et al., "An access control model for multi-level security in multi-domain networking environments", IEEE, doi: 10.1109/ICMIC.2017.8321566, 2017, pp. 809-814. (Year: 2017).*

(Continued)

*Primary Examiner* — Peter C Shaw
(74) *Attorney, Agent, or Firm* — Greenberg Traurig

(57) ABSTRACT

Systems, apparatuses, and methods related to securing domain crossing using domain access tables are described. For example, a computer processor can have registers configured to store locations of domain access tables respectively for predefined, non-hierarchical domains. Each respective domain access table can be pre-associated with a respective domain and can have entries configured to identify entry points of the respective domain. The processor is configured to enforce domain crossing in instruction execution using the domain access tables and to prevent arbitrary and/or unauthorized domain crossing.

18 Claims, 7 Drawing Sheets

(56) References Cited

U.S. PATENT DOCUMENTS

| | | | |
|---|---|---|---|
| 8,607,299 | B2 | 12/2013 | Baker |
| 8,713,563 | B2 | 4/2014 | Kondoh et al. |
| 9,405,515 | B1 | 8/2016 | Bertram et al. |
| 9,519,779 | B2 | 12/2016 | Ghosh et al. |
| 9,575,784 | B1 | 2/2017 | Aron et al. |
| 9,852,084 | B1 | 12/2017 | Soderquist et al. |
| 10,043,001 | B2 | 8/2018 | Ghosh et al. |
| 10,915,457 | B2 | 2/2021 | Wallach |
| 10,915,465 | B2 | 2/2021 | Wallach |
| 10,942,863 | B2 | 3/2021 | Wallach |
| 2004/0078631 | A1* | 4/2004 | Rogers ............... G06F 12/08 714/5.11 |
| 2004/0133777 | A1 | 7/2004 | Kiriansky et al. |
| 2005/0257243 | A1 | 11/2005 | Baker |
| 2008/0086729 | A1* | 4/2008 | Kondoh ............ G06F 9/5077 718/1 |
| 2008/0091891 | A1 | 4/2008 | Shiota et al. |
| 2008/0250217 | A1 | 10/2008 | Kershaw et al. |
| 2008/0276051 | A1 | 11/2008 | Renno |
| 2009/0259846 | A1 | 10/2009 | Watt et al. |
| 2010/0228936 | A1 | 9/2010 | Wright et al. |
| 2010/0235598 | A1 | 9/2010 | Bouvier |
| 2012/0036334 | A1 | 2/2012 | Horman et al. |
| 2013/0132695 | A1* | 5/2013 | Heo ................. G06F 12/1491 711/163 |
| 2014/0173169 | A1 | 6/2014 | Liu et al. |
| 2014/0331019 | A1 | 11/2014 | Parker et al. |
| 2015/0100717 | A1 | 4/2015 | Bennett et al. |
| 2015/0128249 | A1* | 5/2015 | Alexandrian ....... G06F 21/629 726/16 |
| 2015/0180894 | A1* | 6/2015 | Sadovsky ............. H04L 67/22 726/22 |
| 2015/0301850 | A1 | 10/2015 | Jeong et al. |
| 2016/0110298 | A1 | 4/2016 | Koufaty et al. |
| 2016/0210082 | A1 | 7/2016 | Frank et al. |
| 2016/0350019 | A1 | 12/2016 | Koufaty et al. |
| 2016/0381050 | A1 | 12/2016 | Shanbhogue et al. |
| 2017/0060783 | A1 | 3/2017 | Chiu et al. |
| 2017/0367036 | A1* | 12/2017 | Chen ..................... H04L 43/08 |
| 2018/0048648 | A1* | 2/2018 | Angelino ............ G06F 21/6218 |
| 2018/0095902 | A1 | 4/2018 | Lemay et al. |
| 2018/0121665 | A1 | 5/2018 | Anderson et al. |
| 2019/0102537 | A1 | 4/2019 | Zhang et al. |
| 2019/0196983 | A1 | 6/2019 | Khosravi et al. |
| 2020/0073693 | A1 | 3/2020 | Wallach |
| 2020/0073694 | A1 | 3/2020 | Wallach |
| 2020/0073820 | A1 | 3/2020 | Wallach |
| 2020/0073821 | A1 | 3/2020 | Wallach |
| 2020/0073822 | A1 | 3/2020 | Wallach |
| 2020/0073827 | A1 | 3/2020 | Wallach |
| 2020/0074093 | A1 | 3/2020 | Wallach |
| 2021/0141742 | A1 | 5/2021 | Wallach |
| 2021/0149817 | A1 | 5/2021 | Wallach |
| 2021/0157741 | A1 | 5/2021 | Wallach |
| 2021/0240619 | A1 | 8/2021 | Earnshaw |

OTHER PUBLICATIONS

Mouliswaran et al., "Representation of multiple domain role based access control using FCA", IEEE, doi: 10.1109/ICECCT.2015.7226062, 2015, pp. 1-6. (Year: 2015).*

Security Configuration for Memory Address Translation from Object Specific Virtual Address Spaces to a Physical Address Space, U.S. Appl. No. 16/521,311, filed Jul. 23, 2019, Steven Wallach, Application Undergoing Preexam Processing, Jul. 23, 2019.

Access Control for Processor Registers Based on Execution Domains, U.S. Appl. No. 16/520,290, filed Jul. 23, 2019, Steven Wallach, Application Undergoing Preexam Processing, Jul. 23, 2019.

Domain Register for Instructions Being Executed in Computer Processors, U.S. Appl. No. 16/520,298, filed Jul. 23, 2019, Steven Wallach, Application Undergoing Preexam Processing, Jul. 23, 2019.

Dynamic Configuration of a Computer Processor Based on the Presence a Hypervisor of a Hypervisor, U.S. Appl. No. 16/520,304, filed Jul. 23, 2019, Steven Wallach, Status: Application Undergoing Preexam Processing, Jul. 23, 2019

Virtual Machine Register in a Computer Processor, U.S. Appl. No. 16/520,310, filed Jul. 23, 2019, Steven Wallach, Application Undergoing Preexam Processing, Jul. 23, 2019.

Memory Access Control Through Permissions Specified in Page Table Entries for Execution Domains, U.S. Appl. No. 16/520,292, filed Jul. 23, 2019, Steven Wallach, Application Undergoing Preexam Processing, Jul. 23, 2019.

Security Configurations in Page Table Entries for Execution Domains, U.S. Appl. No. 16/520,296, filed Jul. 23, 2019, Steven Wallach, Application Undergoing Preexam Processing, Jul. 23, 2019.

"Hash table. Collision resolution by chaining (closed addressing)", Algorithms and Data Strcutures: with mplementations in Java and C++, http://www.algolist.net/Data_structures/Hash_table/Chaining, printed on Aug. 30, 2018.

Call stack, Wikipedia, printed on Aug. 10, 2018.

Capability-based addressing, Wikipedia, printed on Sep. 13, 2018.

Explain Hashed page tables in operating system, https://cs.stackexchange.com/questions/85207/explain-hashed-page-tables-in-operating-system, printed on Aug. 17, 2018.

G. J. Myers, B. R. S. Buckingham, "A Hardware Implemenation of Capability-based Addressing", ACM SIGARCH Computer Architecture News Homepage archive, vol. 8, Iss. 6, Oct. 1980.

George Radin, Peter R. Schneider, "An Architecture for an Extended Machine With Protected Addressing", May 21, 1976.

Hash table, Wikipedia, printed on Aug. 30, 2018.

Hypervisor, Wikipedia, printed on Apr. 19, 2018.

Michael D. Schroeder, Jerome H. Saltzer, "A Hardware Architecture for Implementing Protection Rings", Presented at the Third ACM Symposium on Operating Systems Principles, Palo Alto, CA, Oct. 1971.

Page replacement algorithm, Wikipedia, printed on Jul. 31, 2018.

Page table, Wikipedia, printed on Jul. 31, 2018.

Protection ring, Wikipedia, printed on Jul. 31, 2018.

R. S. Fabry, "Capability-Based Addressing", Communications of the ACM, Jul. 1974.

Sandbox (computer security), Wikipedia, printed on Aug. 21, 2018.

Stack register, Wikipedia, printed on Aug. 10, 2018.

The RISC-V Instruction Set Manual, vol. II: Privileged Architecture, May 7, 2017.

International Search Report and Written Opinion, PCT/US2019/048015, dated Dec. 12, 2019.

International Search Report and Written Opinion, PCT/US2019/048006, dated Dec. 11, 2019.

International Search Report and Written Opinion, PCT/US2019/048008, dated Dec. 12, 2019.

International Search Report and Written Opinion, PCT/US2019/048023, dated Dec. 17, 2019.

International Search Report and Written Opinion, PCT/US2019/048020, dated Dec. 17, 2019.

International Search Report and Written Opinion, PCT/US2019/048019, dated Dec. 17, 2019.

International Search Report and Written Opinion, PCT/US2019/048013, datedd Dec. 13, 2019.

International Search Report and Written Opinion, PCT/US2019/048018, dated Dec. 17, 2019.

* cited by examiner

DOMAIN CROSSING IN EXECUTING INSTRUCTIONS IN COMPUTER PROCESSORS

RELATED APPLICATIONS

The present application claims the benefit of the filing dates of Prov. U.S. Pat. App. Ser. No. 62/725,030, filed on Aug. 30, 2018 and entitled "Domain Crossing in Executing Instructions in Computer Processors," Prov. U.S. Pat. App. Ser. No. 62/724,896, filed on Aug. 30, 2018 and entitled "Memory Access Control through Permissions Specified in Page Table Entries for Execution Domains," Prov. U.S. Pat. App. Ser. No. 62/724,913, filed on Aug. 30, 2018 and entitled "Security Configurations in Page Table Entries for Execution Domains," Prov. U.S. Pat. App. Ser. No. 62/724,929, filed on Aug. 30, 2018 and entitled "Access Control for Processor Registers based on Execution Domains," and Prov. U.S. Pat. App. Ser. No. 62/724,999, filed on Aug. 30, 2018 and entitled "Domain Register for Instructions being Executed in Computer Processors," the entire disclosures of which applications are hereby incorporated herein by reference.

FIELD OF THE TECHNOLOGY

At least some embodiments disclosed herein relate generally to computer architecture and more specifically, but not limited to, securing domain crossing in execution of instructions in a computer processor.

BACKGROUND

Instructions programmed for a computer can be structured in layers. One layer can provide resources and services for another layer. For example, a hypervisor can create or provision virtual machines that are implemented on the hardware components of the computer. An operating system can offer resources and services using resources available in a computer having predefined architecture. The computer resources or computer operated upon by the operating system can be actual computer hardware components, or virtual machine components provisioned by a hypervisor. An application can provide application specific functions using the services and resources provided by an operating system.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes the techniques of securing calls for executing routines across different, non-hierarchical, domains.

In a traditional system, different layers of instructions (e.g., user applications vs. operating system) may be given different levels of privilege and/or trust. Conventionally, protection rings have been constructed and implemented in computers to protect data and functionality from fault and malicious behaviors based on a hierarchy of rings. Rings are statically arranged in the hierarchy from most privileged (and thus most trusted) to least privileged (and thus least trusted). For example, the hierarchy can include a ring of operating system kernel that is the most privileged, a ring of device drivers, and a ring of applications that are the least privileged. A program or routine in a lower privilege ring can be limited by a respective special hardware enforced control gate to access the resources and services of a higher privilege ring in the hierarchy. Gating access between rings can improve security.

In the techniques of the present disclosure, instructions or routines programmed for a computer system can be classified into a set of predefined, non-hierarchical, domains, such as a domain of hypervisor, a domain of operating system, a domain of application, etc. One or more domain access tables can be used to specify the entry points that are allowed to make calls to execute routines in domains different from the current domain. Each domain access table can be associated with a respective domain. A set of registers can be used to identify the bases of the domain access tables of the domains. A domain register can be configured in a processor to store an identifier or indicator of the current domain of instructions that are currently being executed in the processor. After a call is successfully processed via a domain access table to execute a routine, the content of the domain register is updated to show the domain of the domain access table used to process the call. When the execution of the called routine returns to the calling routine across domains, the return can be processed in a way similar to a call. Thus, arbitrary and/or unauthorized domain crossing can be prevented.

Figure 1:
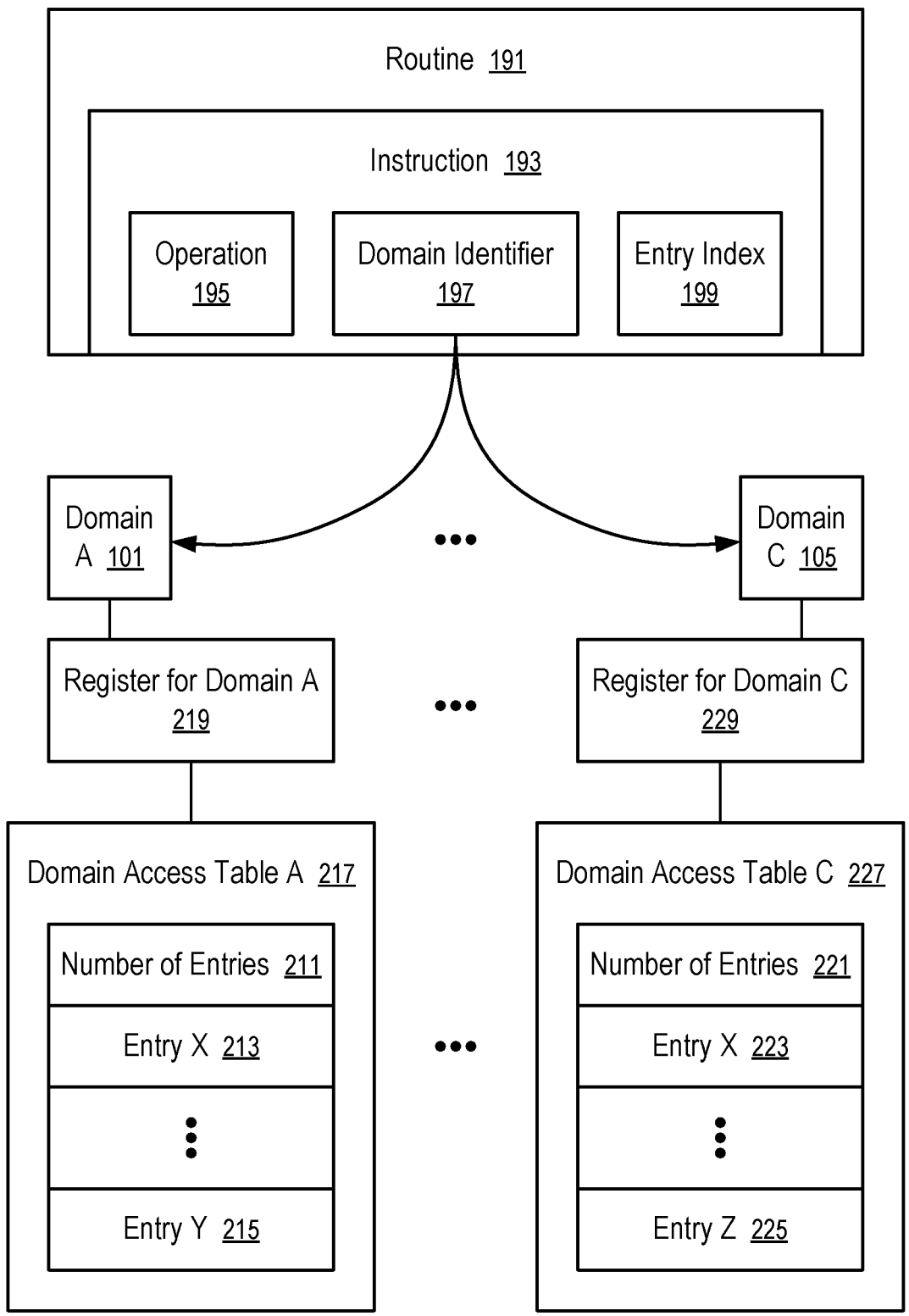
FIG. 1 illustrates the execution of an instruction to access routines in different domains using domain access tables according to some embodiment.

FIG. 1 illustrates the execution of an instruction (193) to access routines in different domains (e.g., 101, . . . , 105) using domain access tables (217, . . . , 227) according to some embodiment.

Routines programmed for a computer system can be classified into various predefined, non-hierarchical, domains (e.g., 101, . . . , 105). Examples of execution domains include a domain of hypervisor, a domain of operating system, a domain of application, etc. A hypervisor or virtual machine monitor (VMM) creates and manages virtual machines. The hypervisor can control basic functions such as physical memory and input/output.

The instruction (193) of a routine (191) that is currently being executed a computer processor in a domain can request the transition into a routine in another domain. Since the instruction (193) of FIG. 1 requests the transition from a source domain to a destination domain, the instruction (193) is configured to identify a domain identifier (197) of the destination domain, in addition to the operation (195) specific to the transaction. For example, the operation (195) can be calling a routine in the destination domain, or returning to a routine in the destination domain from a previous call. The domain identifier (197) in the instruction (193) explicitly identifies the destination domain (e.g., 101, ..., or 105); and an entry index (199) provided in the instruction (193) specifies an entry point in the domain access table (e.g., 217, ..., or 227) of the corresponding destination domain (e.g., 101, ..., or 105). In some implementations, the domain identifier (197) can be specified in a register (or stack) configured to store the identifier (197) of the destination domain for the execution of an instruction (e.g., 193) that requires the transition of execution control (e.g., calling a called routine, or returning back to a calling routine).

In FIG. 1, each domain (e.g., 101, ..., or 105) has a corresponding register (e.g., 219, ..., or 229) that identifies the base or memory location of a corresponding domain access table (e.g., 217, ..., or 229). The computer system is loaded with contents of valid domain access tables (e.g., 217, ..., or 229)

For example, when the domain identifier (197) is for the domain A (101), its associated register (219) is used to locate the domain access table A (217). The domain access table A (217) stores the number of available entries (211) that can be used in the validation of the entry index (199) for the domain A (101). For example, the processor can validate the entry index (199) provided in the instruction (193) validated against the valid index range defined by the number of available entries (211). If the entry index (199) is valid in view of the number of entries (211) of the domain access table (217), the entry index (199) can be used to look up an entry (e.g., 213, ..., or 215) in the domain access table A (217). The entry (e.g., 213, ..., or 215) looked up from the domain access table A (217) can be used to securely transfer execution control from the source domain of the instruction (193) of the routine (191) to the destination domain (101) identified by the domain identifier (197) provided in the instruction (193).

Similarly, when the domain identifier (197) is for the domain C (105), its associated register (229) can be used to locate the corresponding domain access table C (227) that is configured specifically for the domain C (105). The number of entries (221) of the domain access table C (227) is used to check the validity of the entry index (199) provided in the instruction (193); and if the entry index (199) is valid, an entry (e.g., 223, ..., or 225) is looked up from the domain access table C (227) for transfer execution control from the source domain of the routine (191) containing the instruction (193) to the destination domain (105).

In some implementations, transfer execution control from one domain (101) to another domain (e.g., 105) is permitted only through the pre-defined domain access tables (e.g., 217, ..., 227). Arbitrary domain crossing is prohibited. Thus, the security of the computer system is improved.

In some implementations, the entries (e.g., 213, ..., 215; 223, ..., 225) of the domain access tables (217, ..., 227) can optionally include permission data for authorization of the transition from source domains to the respective entry points represented by the respective entries (e.g., 213, ..., 215; 223, ..., 225).

For example, the entry X (223) for the domain A (105) can have permission data allowing the transition from the domain of the instruction (193) into the entry point in the domain (105) identified by the entry X (223); and the entry Z (225) for the same domain A (105) can have different permission data denying the transition from the same domain of the same instruction (193) into the entry point in the same destination domain (105) identified by the entry Z (225).

In some implementations, the entries (e.g., 213, ..., 215; 223, ..., 225) can optionally include security option data for transitioning from the various source domains to the respective entry points represented by the entries (e.g., 213, ..., 215; 223, ..., 225).

For example, the entry X (223) for the destination domain (105) can have security option data requiring sandboxing for transition from the source domain of the instruction (193) into the entry point defined by the entry X (223) in the domain (105); and the entry Z (225) for a different entry point in the destination domain (105) can have different security option data not using sandboxing for the transition from the same source domain of the instruction (193) into the entry point defined by the entry Z (225) in the same destination domain (105).

In some implementations, the entries (e.g., 213, ..., 215; 223, ..., 225) can provide virtual memory addresses for accessing the routines that are the entry points of the domains (101, ..., 105). The permission data and security option data can be specified in the page table entries for translating the virtual memory addresses to physical addresses, as discussed further below.

FIG. 1 illustrates an example of using separate domain access tables (217, ..., 227) for different domains (e.g., 101, ..., 105). Alternatively, the entries (e.g., 213, ..., 215; 223, ..., 225) can be combined in a combined domain access table, where the entries of the tables contain information to identify the domains of the routines identified by the entries (e.g., 213, ..., 215; 223, ..., 225). For example, the entries (e.g., 213, ..., 215; 223, ..., 225) can be memory addresses for locating the respective routines; and the identifiers of the domains can be encoded or embedded within the memory addresses. In some implementations, a processor is configured to reject domain crossing that are not made using the form of instructions (e.g., 193) illustrated in FIG. 1.

In one implementation, each domain (101, ..., or 105) has a separate memory area configured to store the values of registers of the respective domain (101, ..., or 105). Such a separate memory area for storing the values of registers specific to a domain (e.g., 101) while the execution transits temporarily to another domain is accessible the respective domain (e.g., 101) but not accessible to other domains (e.g., 105). Since other domains (e.g., 101) are prevented from accessing the register value region of a given domain (e.g., 105), the register states of the given domain (e.g., 105) are isolated and protected from executions in the other domains (e.g., 101). For example, the memory area for domain specific registers of a particular domain (e.g., 101) can store the value of the program counter (PC) of instructions being executed in the processor, the value of the stack pointer (SP) of a stack for instruction execution, the value of the frame pointer (FP) of the stack, the value of the argument pointer (AP) for the stack, and/or the value of the processor status word (PSW), etc. The particular domain (e.g., 101) can have a separate stack separated from the stacks of the other domains (e.g., 105); and the other domains do not have access to the stack of the particular domain (e.g., 101). When a calling routine running in a domain (e.g., 101) calls, using a domain call instruction (191), to execute a called routine in another domain (e.g., 105), the values of the registers (e.g., PC, SP, FP, AP, PSW) used for the calling domain (e.g., 101) are stored in the memory in the register value region of the calling domain (e.g., 101). Before transitioning the execution from the calling domain (e.g., 101), the processor can store the current values of the registers (e.g., PC, SP, FP, AP, PSW) in the register value region of the calling domain (e.g., 101); and after transitioning the execution to the called domain (e.g., 105), the processor can initialize the register value region of the called domain (e.g., 105). For example, the program counter (PC) of the called domain (e.g., 105) can be initialized to have the value obtained from an entry (e.g., 223, . . . , or 225) of the domain access table (227) of the called domain (e.g., 105), which allows the processor to start the processing the called routine in the called domain (105). When a domain return instruction (191) specifies a destination domain (e.g., 101) to return to, the processor can retrieve the registers values from the register value region of the destination domain (e.g., 101) for the return and initializes the respective registers (e.g., PC, SP, FP, AP, PSW) using the retrieved values. If there is a valid return block in the stack of the destination domain (e.g., 101), the return can be executed to a corresponding return point identified in the stack of the destination domain (e.g., 101) for the return.

Alternatively, and/or in combination, each domain (101, . . . , or 105) can have a separate set of such registers (e.g., PC, SP, FP, AP, PSW), which can function as the register value region of the respective domain (101, . . . , or 105).

Figure 2:
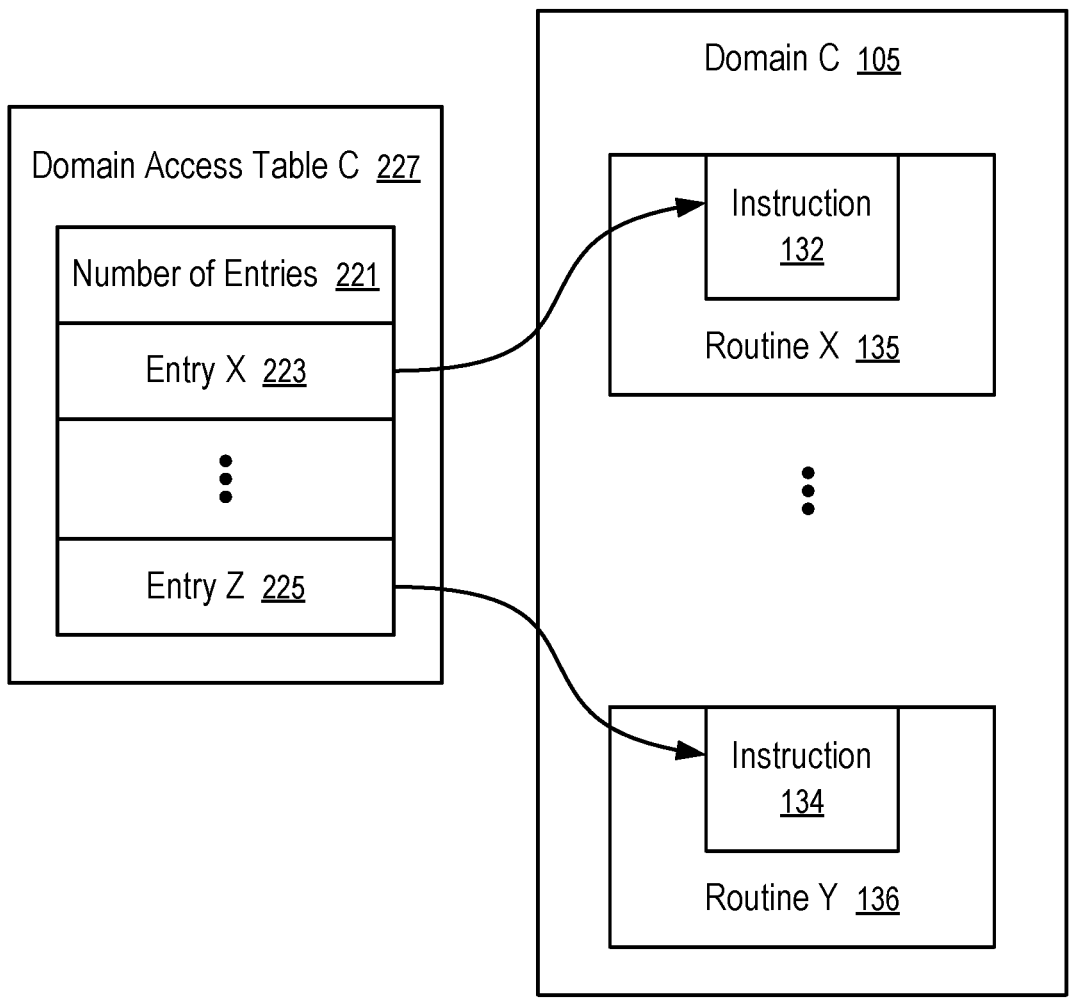
FIG. 2 illustrates the use of a domain access table to access routines in a domain.

FIG. 2 illustrates the use of a domain access table (217) to access routines (135, . . . , 136) in a domain (101).

In FIG. 2, each of the entries (223, . . . , 225) identifies the location of a respective routine (135, . . . , or 136) in the domain (105). For example, the location can be identified as a memory address of an instruction (e.g., 132, . . . , or 134) at the beginning of the respective routine (e.g., 135, . . . , or 136). For example, each entry (223, . . . , or 225) can be a memory address of a corresponding routine (135, . . . , 136); and a processor of the computer system can use the memory address looked up from the domain access table (227) to transfer execution control to the routine that is being called using the instruction (193) of FIG. 1.

Optionally, a domain register of a computer processor can be used to store the domain identifier of the routine (e.g., 191) that is currently being executed in the computer processor. For example, upon the execution of the instruction (193) that causes domain crossing, the content of the domain register can be updated to store the domain identifier (197) of the instruction (193), after the instruction (193) is successfully processed (e.g., using the domain access table (227)) to run the target routine (e.g., 135, . . . , or 136). The content of the domain register can control various security operations of the processor.

For example, when the execution of an instruction results in a request to access a memory location identified using a virtual memory address, the virtual memory address can be translated to a physical memory address using one or more page tables. The content of the domain register can be used to select, from a page table entry, a permission bit for the memory access made in the current domain. The selected permission bit can control the processing of the request to access a memory unit identified by the virtual memory address.

For example, when a call is made to execution a routine having a virtual memory address, the content of the domain register can be used to select a security bit from a page table entry that is used to translate the virtual memory address to a physical memory address. The security bit is selected for executing the routine in providing services for the current domain identified by the domain register. The selected security bit controls security operations of separating resources and/or data between the called routine and the calling routine.

For example, when the execution of an instruction generates a request to access a privileged register, the content of the domain register can be used to select, from a permission register for example, a permission bit for the current domain to access the privileged register. The permission bit can control the acceptance or rejection of the request to access the privileged register.

Figure 3:
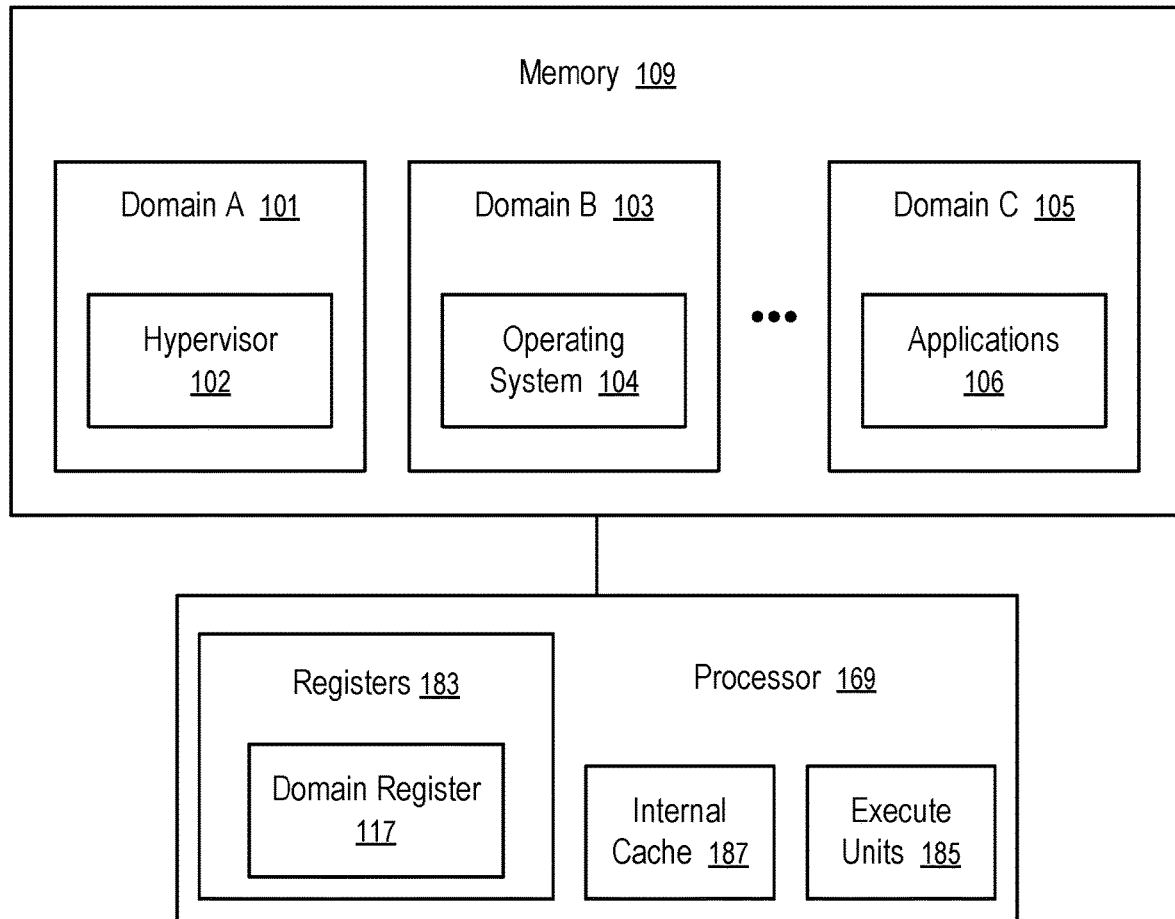
FIG. 3 shows a computer processor having a domain register according to some embodiments.

FIG. 3 shows a computer processor (169) having a domain register (117) according to some embodiments.

The computer processor (169) of FIG. 3 is coupled to memory (109) that stores routines of various predefined, non-hierarchical, domains (101, 103, . . . , 105), such as a domain (101) of hypervisor (102), a domain (103) of operating system (104), a domain (105) of application (106). The physical memory (109) can be used to store data and instructions for various routines programmed for a computer system.

For example, routines of a hypervisor (102) can be classified in a domain A (101); routines of an operating system (104) can be classified in another domain B (103); and routines of applications (106) can be classified in a further domain C (105). A hypervisor or virtual machine monitor (VMM) creates and manages virtual machines. The hypervisor can control basic functions such as physical memory and input/output (I/O).

In general, a routine can include a pre-programmed set of instructions stored in the memory (109). The routine can also have input data, output data, and/or, temporary data stored in the memory (109). A routine can invoke or call another routine for services and/or resources. The calling routine and the called routine can be in a same domain or different domains (e.g., 101, 103, . . . , 105).

The processor (169) of FIG. 3 has execution units (e.g., 185), such as an arithmetic-logic unit. The processor (169) can include an internal cache (187) as a proxy of a portion of the memory (109). The processor (169) has registers (183) to hold instructions for execution, data as operands of instructions, and/or results of instruction executions.

The domain register (117) is one of the registers (183) of the processor (169). The domain register (117) stores the identifier or indicator of a current domain of a set of instructions (e.g., a routine) being executed in the processor (169). The content of the domain register (117) controls security operations in the processor (169) as further discussed below.

In one implementation, when a computer system having the processor (169) is initially powered on (bootstrapped), the processor (169) is configured to automatically execute routines of a hypervisor (102) or an operating system (104) (if no hypervisor is used). This is part of the bootstrap process. Thus, the domain register (117) is initially set to indicate the domain (101) of the hypervisor (102) or the domain (103) of the operating system (104). Subsequently, the execution control can move from one domain to another domain using instructions (e.g., 193 illustrated in FIG. 1) that identify the destination domains; and the content of the domain register (117) can be updated according to the processing of such instructions (e.g., 193 illustrated in FIG. 1).

Alternatively or in combination, the domain of the currently running routine can be identified based on memory addresses, stored attributes of the routines, etc.

For example, some techniques to specify the current domain (123) in the domain register (117) in the computer processor (169) can be found in U.S. Pat. App. Ser. No. 62/724,999, filed on Aug. 30, 2018 and entitled "Domain Register for Instructions being Executed in Computer Processors," the entire disclosure of which application is hereby incorporated herein by reference.

In some instances, the current domain (123) can be identified from a memory address used to load an instruction (193) of a routine (191) for execution.

For example, the memory address has a predetermined width (e.g., a predetermined number of bits) for the processor (169). The memory address can include a portion representing an object ID and a portion representing an offset within the object represented by the object ID. For example, the routine (191) can be an object located at the address; and the object ID of the address can be used to identify certain proprieties of the instruction (193) and/or the routine (191); and the current domain (123) can be determined from the properties.

For example, a static object ID of a predetermined value (e.g., 0) can be used to represent a kernel object of an operating system (104). Thus, the static object ID specified in the memory address can be used to identify the current domain (123) for the execution of the routine (191). Some details and examples of static object IDs in memory addresses for computer processors to load instructions for execution can be found in U.S. patent application Ser. No. 16/028,840, filed Jul. 6, 2018 and entitled "Static Identifications in Object-based Memory Access," the entire disclosure of which application is hereby incorporated herein by reference.

In some instances, the object ID of a memory address can include a portion representing an object type. For example, an object type of a value from 0 to 3 can be used to identify a kernel object of an operating system. For example, an object type of a value of 4 to 5 can be used to specify that the offset is an address of different widths (e.g., a 64-bit address or 32-bit address included within the memory address that has 128 bits). For example, an object type of a value of 6 to 7 can be used to specify that a predetermined portion of the object ID is to be interpreted as an identifier of a local object or an object in Partitioned Global Address Space (PGAS). For example, an object type of a value of 32 can be used to specify that the remaining portion of the object ID is to be interpreted as an identifier of an object defined in a server (e.g., 197). For example, an object name server can store data indicating the name of an object represented by an object ID, access control parameters of the object, and/or other attributes of the object.

For example, the object ID (199) of the memory address used to load the routine (191) for execution can have attributes stored in the object name server. The attributes can be used to determine or infer the current domain (123) of the routine loaded from the memory address.

In some instances, the routine (191) has attributes that are stored in association with the routine (191) (e.g., in the memory (109), in a page table entry for the determination of a physical address of the instruction (193), in an entry table for making calls for the execution of routines). When the routine (191) is loaded for execution, the attributes of the routine (191) are used to determine the current domain (123) for the execution of the routine (191).

Figure 4:
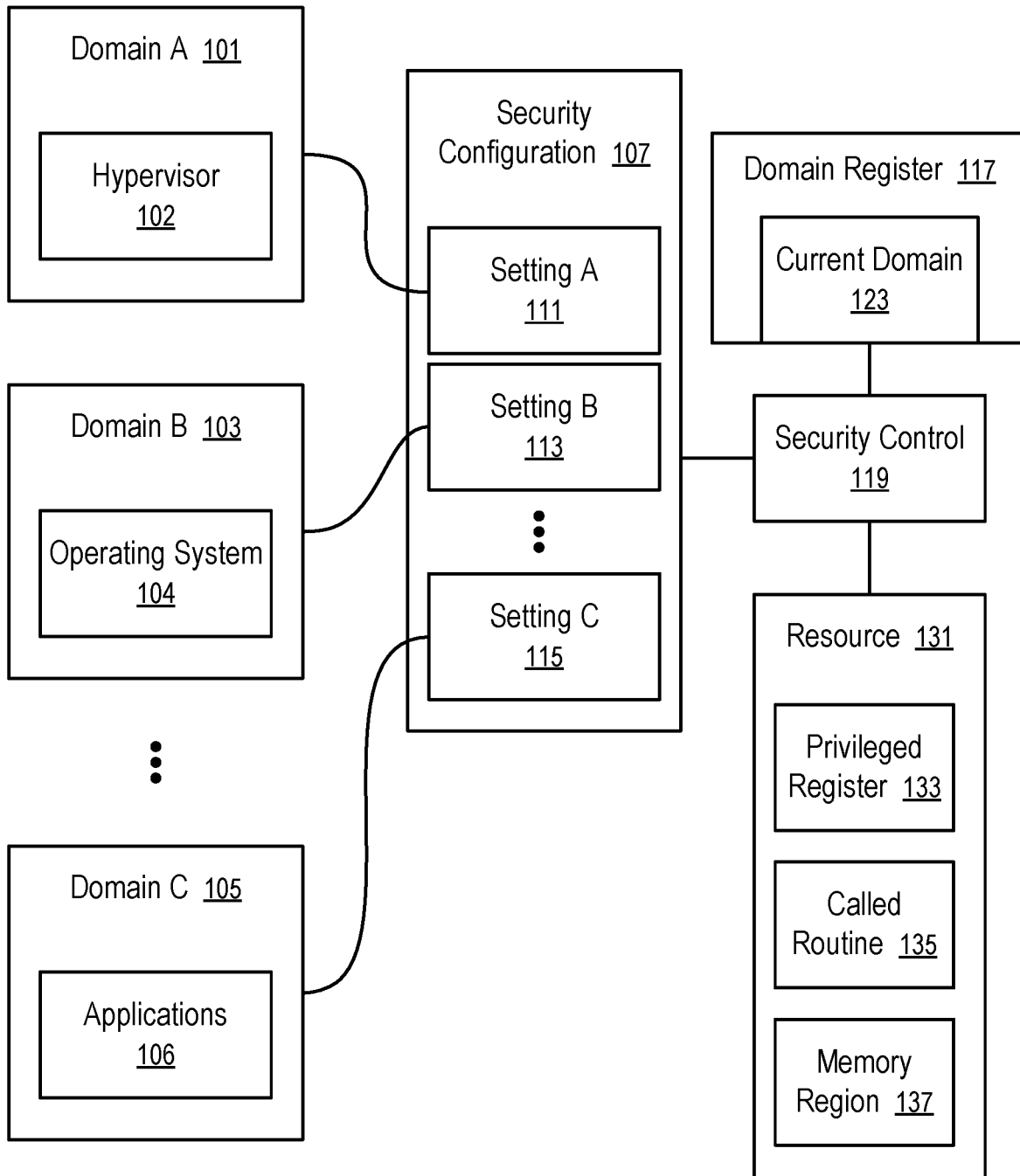
FIG. 4 shows a system to control security operations applied to resources in accordance with a domain register.

FIG. 4 shows a system to control security operations applied to resources (e.g., 131) in accordance with a domain register (117).

In FIG. 4, a security control (119) is implemented based on the current domain (123) specified in the domain register (117), and the security configuration (107) having settings (111, 113, ..., 115) specified separately for the predefined domains (101, 103, ..., 105) respectively. The security control (119) is applied to a resource (131), which can be a privileged register (133), a called routine (135), a memory region (137), etc.

The security configuration (107) can have settings (111, 113, ..., 115) for the domains (101, 103, ..., 105) respectively, without relying upon a static hierarchy of trust among the domains (101, 103, ..., 105).

During the executing of a routine (191) in the processor (169), the domain register (117) causes the security control (119) to select a setting (e.g., 111, 113, ..., or 115) that is pre-associated with a domain (e.g., 101, 103, ..., or 105) matching with the current domain (123). The selected setting (e.g., 111, 113, ..., or 115) is used by the security control (119) to customize security operations for the resource (131).

For example, when the execution of an instruction (193) of the routine (191) in the processor (169) requests memory access to the memory region (137), the selected setting (e.g., 111, 113, ..., or 115) having its pre-associated domain (e.g., 101, 103, ..., 105) matching the current domain (123) is used by the security control (119) to determine whether the memory access permissible.

For example, different regions (e.g., 137) in the memory (109) can be configured with different security configurations (e.g., 107); and each security configuration (e.g., 107) can include different permissions (e.g., 111, 113, ..., 115) for different domains (101, 103, ..., 105). The security configuration (107) can be specified, for example, in a page table entry used in logical to physical address translation of virtual memory addresses, such that the structure of the memory regions can correspond to the memory page structure, as further discussed below in connection with FIG. 5.

For example, the physical memory (109) can be divided into multiple regions; each region (e.g., 137) can be a page of physical memory (109) for memory management, or a set of pages of physical memory (109).

For example, a typical memory region (137) can have a respective security configuration (107) specified for the set of predefined domains (101, 103, ..., 105). The security configuration (107) explicitly identify the permissions (e.g., 111, 113, ..., 115) for the domains (101, 103, ..., 105) respectively. Thus, the privileges of routines to access the memory region (137) are not dependent on a hierarchy of the domains (102, 103, ..., 105).

In one example, when a routine (191) executed in the current domain (123) causes memory access to the memory region (137) for read, write, or execution of instructions, the domain register (117) causes the security control (119) to check the permission specified in the setting (111, 113, ..., or 115) that is corresponding to the current domain (123). Whether or not to block (or reject) an access to the memory region (137) for a particular type of operations (e.g., read, write, execution) by the execution of an instruction (193) of the routine (191) in the current domain (123) can be determined based on a respective permission bit that is selected according to the current domain (123) for the memory region (137), and for the type of operations. Some details and examples of permissions for memory access to the memory region (137) can be found in U.S. Pat. App. Ser. No. 62/724,896, filed on Aug. 30, 2018 and entitled "Memory Access Control through Permissions Specified in Page Table Entries for Execution Domains," the entire disclosure of which application is hereby incorporated herein by reference.

In general, different routines of a same domain (e.g., 103) can be configured to in different memory regions and thus configured to have different permissions and security settings for the same domain (e.g., 103).

Further, a routine can be configured to store different portions of its data in different memory regions (e.g., 137)

and thus configured to have different permissions for accessing from a same domain (e.g., 101, 103, . . . , or 105).

In another example, when a routine (191) executed in the current domain (123) calls a called routine (135) stored in the memory region (137) for execution, the domain register (117) causes the security control (119) to check the permission specified in the setting (111, 113, . . . , or 115) that is corresponding to the current domain (123). Whether or not to deploy a security measure to protect the resources of the calling routine (191) against the called routine (135) and/or protect the resources of the called routine (135) against the calling routine can be determined based on a respective permission bit that is specified for the current domain (123) and for the memory region (137).

Security measures can include sandboxing. Sandboxing in general includes a computer security measure that isolates the execution of a set of instructions (e.g., an application) from certain system resources and/or other sets of instructions/programs. For example, sandboxing can be implemented using a shadow stack structure where the calling routine and the called routine are configured to use separate stacks and control registers related to the stacks, the calling routine can be prevented from accessing the stack assigned to the called routine, and the called routine can be prevented from accessing the stack assigned to the calling routine. Some details and examples of a shadow stack structure can be found in U.S. Pat. App. Ser. No. 62/724,913, filed on Aug. 30, 2018 and entitled "Security Configurations in Page Table Entries for Execution Domains," the entire disclosure of which application is hereby incorporated herein by reference.

For example, the security configuration (107) of a typical memory region (137) can have sandboxing settings (e.g., 111, 113, . . . , 115) specified for the set of predefined domains (e.g., 101, 103, . . . , 105) respectively. The sandboxing configuration (107) explicitly identifies whether or not a sandboxing operating is required for a call to execution a called routine (135) stored in the region (137). Calls to execute the same routine (135) from routines executed in the different domains (101, 103, . . . , 105) can have different settings (111, 113, . . . , 115); and the settings (111, 113, . . . , 115) specify whether the calls from the respectively domains (101, 103, . . . , 105) require sandboxing (e.g., to protect the called routine (135) and the calling routine (191) from each other). Thus, the sandboxing operations can be selectively applied for the execution of the called routine (135) stored in the memory region (137), based on the current domain (123) identified in the domain register (117) and the explicit settings (e.g., 111, 113, . . . , 115) configured for the respective domains (101, 103, . . . , 105), without relying upon a predefined hierarchy of domains (102, 103, . . . , 105).

For example, a calling routine (191) in the current domain (123) can call the called routine (135). Whether or not to invoke a sandboxing operation for the call to execute the called routine (135) stored in the memory region (137) can be determined based on the sandbox setting (e.g., 111, 113, . . . , or 115) that is specified for the respective domain (e.g., 101, 103, . . . , or 105) matching with the current domain (123) for the memory region (137). Thus, the sandboxing operation can be invoked independent of a relative hierarchy between the domain of the called routine (135) and the current calling domain (123).

The sandbox settings (107) for routines stored in the memory region (137) can be specified, for example, in a page table entry used in logical to physical address translation of virtual memory addresses, such that the structure of the memory regions can correspond to the memory page structure, as further discussed below in connection with FIG. 5.

In a further example, when a routine (191) executed in the current domain (123) requests access to a privileged register (133), the domain register (117) causes the security control (119) to check the permission specified in the setting (111, 113, . . . , or 115) for the privileged register (133). Whether or not to permit or block the access can be determined based on a respective permission bit that is specified for the current domain (123) and for the privilege register (133).

For example, the privileged register (133) can have different permissions (111, 113, . . . , 115) for the different domains (101, 103, . . . , 105) respectively. When an instruction executed in the current domain (123) requests to access the register privileged (133), the domain register (117) causes the security control (119) to select a respective permission (e.g., 111, 113, . . . , or 115) corresponding to the current domain (123) to control the access.

The register (133) can have explicit permissions (111, 113, . . . , 115) specified separately for the domains (101, 103, . . . , 105) respectively (e.g., non-hierarchical), without relying upon a predefined hierarchy of trust for the domains (102, 103, . . . , 105).

In some instances, the privileged register (133) can be accessed for different types of operations, such as read, write, execution, etc. The permission (e.g., 111, 113, . . . , or 115) for a particular domain (e.g., 101, 103, . . . , or 105) to access the privileged register (133) can have separate permission bits for the respective types of operations (e.g., read, write, and/or execution).

The security configuration (107) can be configured to allow an instruction running in one domain (e.g., 101, 103, . . . , 105) to access the register (133) for one type of operations (e.g., read) but not for another type of operations (e.g., write).

The security configuration (107) can be configured to allow an instruction executing in one domain (e.g., 103) to access the register (e.g., 133) via one permission setting (e.g., 113) for the domain (e.g., 103), but prohibit the same instruction running in another domain (e.g., 101) from accessing the register (133) via another concurrent setting (e.g., 111) for that domain (e.g., 101), even when the disallowed domain (e.g., 101) can be more privileged (and thus trusted) than the allowed domain (e.g., 103) in traditional protection rings.

In one implementation, the security configuration (107) is hardwired in a processor for the privileged register (133). In another implementation, the security configuration (107) can be set via firmware for the register (133) of a processor during a start-up/boot up process of a computer system. In a further implementation, the security configuration (107) can be changed via privileged software during the normal operations of the computer system.

For example, the security configuration (107) for the privileged register (133) can be changed when the processor (169) switches from running a program in one domain (e.g., 101) to running a program in another domain (e.g., 103).

For example, the security configuration (107) for the privileged register (133) can be changed in accordance with a request when the computer system switches from running one routine to another routine, where the routines can be in the same domain (e.g., 101).

For example, the security configuration (107) for the privileged register (133) can be configured in a permission register that controls access to the privileged register (133) using permission bits stored in the permission register; and the content of the permission register can be updated by an authorized process to adjust/customize the security level of the computer system for the current computation. Alternatively, permissions bits for different domains (101, 103, . . . , 105) can be specified in separate registers that correspond to the domains (101, 103, . . . , 105) respectively. Some details and examples of permission registers can be found in U.S. Pat. App. Ser. No. 62/724,929, filed on Aug. 30, 2018 and entitled "Access Control for Processor Registers based on Execution Domains," the entire disclosure of which application is hereby incorporated herein by reference.

Since the security control system of FIG. 4 does not rely upon a predefined domain hierarchy of trust (i.e., non-hierarchical), it can provide better flexibility and finer control granularity than the conventional protection rings.

Figure 5:
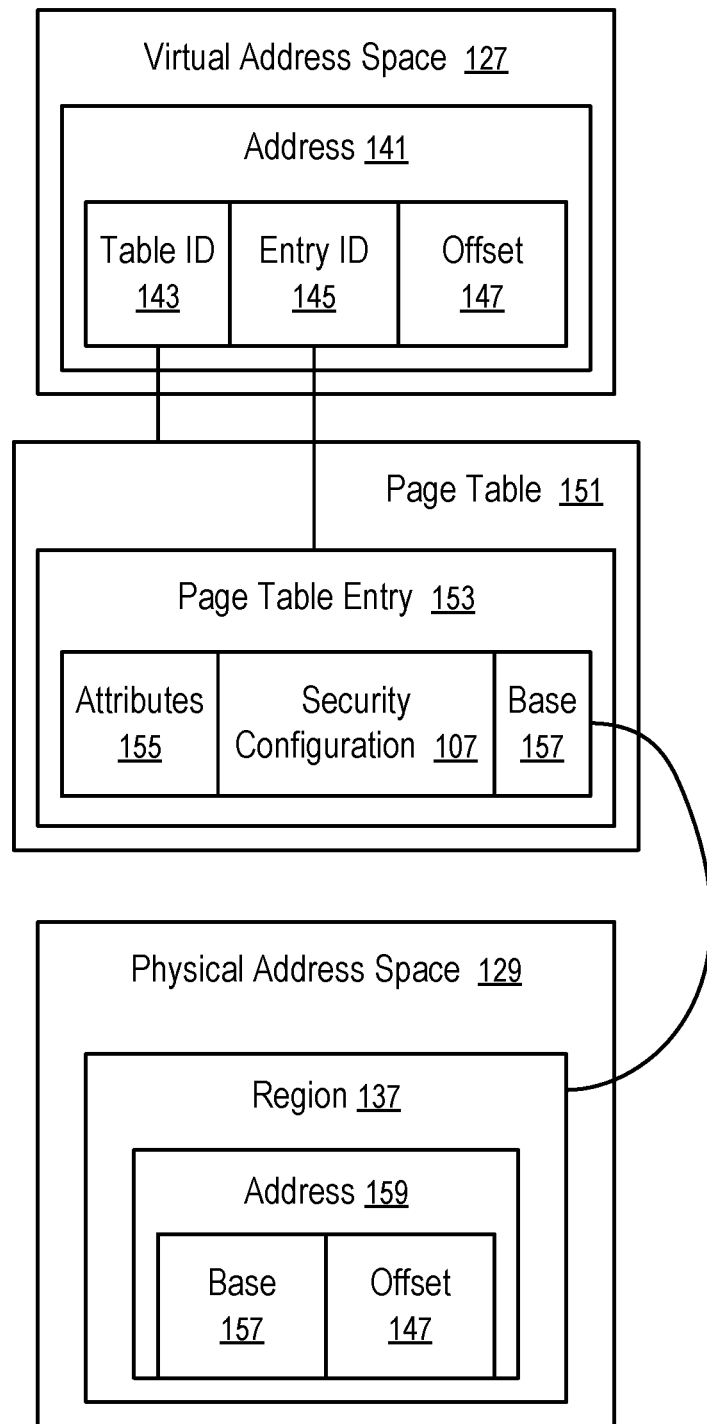
FIG. 5 illustrates a page table entry having a security configuration for execution domains.

FIG. 5 illustrates a page table entry (153) having a security configuration (107) for execution domains (e.g., 101, 103, . . . , 105).

For example, the security configuration (107) in the page table entry can be permissions for accessing the memory region (137) identified by the page table entry (153) and/or sandboxing configuration for calling routines stored in the memory region (137) that is identified by the page table entry (153).

A typical virtual address (141) in a virtual address space (127) can be translated into a corresponding physical address (159) in a physical address space (129) using a page table (151). In general, multiple page tables (e.g., 151) can be used to map the virtual address space (127) to the physical address space (129).

The virtual address (141) can include a table ID (143), an entry ID (145), and an offset (147). The table ID (143) can be used to identify a page table (151) that contains a page table entry (153) for a page that contains the memory unit that is identified by the virtual address (141) and the physical address (159). The entry ID (145) is used as an index into the page table (151) to locate the page table entry (153) efficiently. The page table entry (153) provides a base (157) of the physical address (159). Physical addresses in the same page of memory share the same base (157). Thus, the base (157) identifies the region (137) in the memory (109). The offset (147) of the virtual address (141) is used as a corresponding offset (147) in the page or region (137) in the memory (109). The combination of the base (157) and the offset (147) provides the physical address (159) corresponding to the virtual address (141).

In FIG. 5, the page table entry (153) specifies not only the base (157) for the page or region (137), but also the security configuration (107) for the page or memory region (137), such as permissions for reading data into the memory region (137) corresponding to the base (157), permissions for writing data into the memory region (137), permissions for executing instructions stored in the memory region (137), sandboxing requirements for calling routines stored in the memory region (137). The security configuration (107) can have separate settings (111, 113, . . . , 115) respectively for the predefined, non-hierarchical domains (101, 103, . . . , 105) illustrated in FIGS. 3 and 4. The current domain (137) in the domain register (117) controls which one of the settings (111, 113, . . . , 115) is used for a current memory access, or a current call to a routine (135) stored in the memory region (137).

Optionally, the page table entry (153) can specify other attributes (155) of the page of physical memory, such as whether the data in the page is valid, whether the page is in main memory, whether the page is dirty (e.g., the changes in data in the page of physical memory have not yet been flushed to a longer-term memory/storage device relative to the memory region (137)). For example, the attributes (155) can include a page fault bit indicating whether the page is in the main memory of the computer or in a storage device of the computer. If the permissions in the security configuration (107) allow the current access to the page of memory and the page fault bit indicate that the page is currently not in the main memory of the computer, the memory management unit (181) can swap the page from the storage device into the main memory of the computer to facilitate the access to the page identified by the page table entry (153). However, if the permissions in the security configuration (107) deny the current access to the page for the current execution domain, it is not necessary to evaluate the page fault bit and/or to swap in the page corresponding to the page table entry (153).

In general, the table ID (143) can be divided into multiple fields used to locate the page table (151). For example, the table ID (143) can include a top table ID identifying a top-level page table and a top table entry ID that is used as an index into the top-level page table to retrieve a page table entry containing an identifier of the page table (151), in a way similar to the entry ID (145) indexing into the page table (151) to identify the page table entry (153) containing the base (157).

In general, an entry ID (145) can be considered a virtual page number in the page table (151); and the virtual page number (e.g., 145) can be used in the page table (151) to look up the page table entry (153) containing the base (157).

For example, the table ID (143) can include a set of virtual page numbers that can be used to identify a chain of page tables (e.g., 151). Each virtual page number is used as an index in a page table (or page directory) to identify the page table entry (or page directory entry) that contains the identity or base of the next level page table (or page directory).

In some instances, different running processes in a computer can have different virtual address spaces (e.g., 127); and the process ID of a running process can be used in determine the top-level page table (or page directory). In some instances, a hash of a portion of the virtual address (141), the process ID, and/or an identification of a virtual machine hosted in the computer system can be used to locate the top-level page table (or page directory). In some instances, a hash is used as an index or key to look up a page table entry. Regardless of how the page table entry (153) is located (e.g., via indexing through multiple page tables, via the use of a hash as an index or key), the content of the page table entry (153) can be configured in a way as illustrated in FIG. 5 to provide the security configuration (107) for different domains (101, 103, . . . , 105) to access the page/memory region (137) and/or the routines stored in the memory region (137) that corresponds to the base (157).

In FIG. 5, the security configuration (107) for a page or region (137) is specified in the bottom-level page table (151), where the page table entry (153) in the bottom-level page table (151) provides the base (157) of the physical address (159).

Alternatively, or in combination, higher-level page tables (or page directories) can also have security configurations for their page table entries (or page directory entries). For example, a page table entry (or page directory entry) identifying the page table (151) can have security configurations for all of the pages in the page table (151); and thus, the domain permission data in the page table entry is applicable to the memory region defined by the page table (151). The hierarchy of security configurations in the chain of page table entries leading to the page table (151) and the security configuration (107) in the bottom-level page table entry (153) can be combined via a logic AND operation or a logic OR operation.

For example, a routine running in a domain (e.g., 101, 103, . . . , 105) can be allowed to access a page identified by the base (157) if all of the permission bits in the chain of page table entries leading to the base (157), including the bottom-level table entry (153), have the value that allows access. Alternatively, a routine running in a domain (e.g., 101, 103, . . . , 105) can be allowed to access a page identified by the base (157) if any of the permission bits in the chain of page table entries leading to the base (157), including the bottom-level table entry (153), have the value that allows access.

For example, a routine running in a domain (e.g., 101, 103, . . . , 105) can be denied of access to a page identified by the base (157) if any of the permission bits in the chain of page table entries leading to the base (157), including the bottom-level table entry (153), have the value that denies access. Alternatively, a routine running in a domain (e.g., 101, 103, . . . , 105) can be denied of access to a page identified by the base (157) only when all of the permission bits in the chain of page table entries leading to the base (157), including the bottom-level table entry (153), have the value that denies access.

For example, when a non-bottom-level page table entry (or page directory entry) indicates that the memory access is prohibited, the operations to translate from the virtual address (141) to the physical address (159) can be interrupted to reject the memory access associated with the virtual address (141). In response to the rejection, a trap to the software designated to handle the rejection is used.

For example, the security configuration (107) can include a set of sandbox setting bits (e.g., 111, 113, . . . , 115) for the set of domains (101, 103, . . . , 105) respectively. When a sandbox setting bit (e.g., 111, 113, . . . , or 115) corresponding to the current domain (123) in the domain register (117) is set to have a first value (e.g., 1 or 0), a current call from a routine (191) in the current domain (123) to a called routine (135) stored in the region (137) is implemented to use a sandboxing operation to protect the calling routine (191) and the called routine (135) from each other (e.g., by using a shadow stack to separate the caller and callee in stack usage). When a sandbox setting bit (e.g., 111, 113, . . . , or 115) corresponding to the current domain (123) in the domain register (117) is set to have a second value (e.g., 0 or 1), a call from the routine (191) in the current domain (123) to the called routine (135) stored in the memory region (123) is implemented without using the sandboxing operation to isolate the caller and callee from each other (e.g., without using a shadow stack).

Optionally, the security configuration (e.g., 107) is specified in the bottom-level page table (151) but not in the higher-level page tables (directories).

Figure 6:
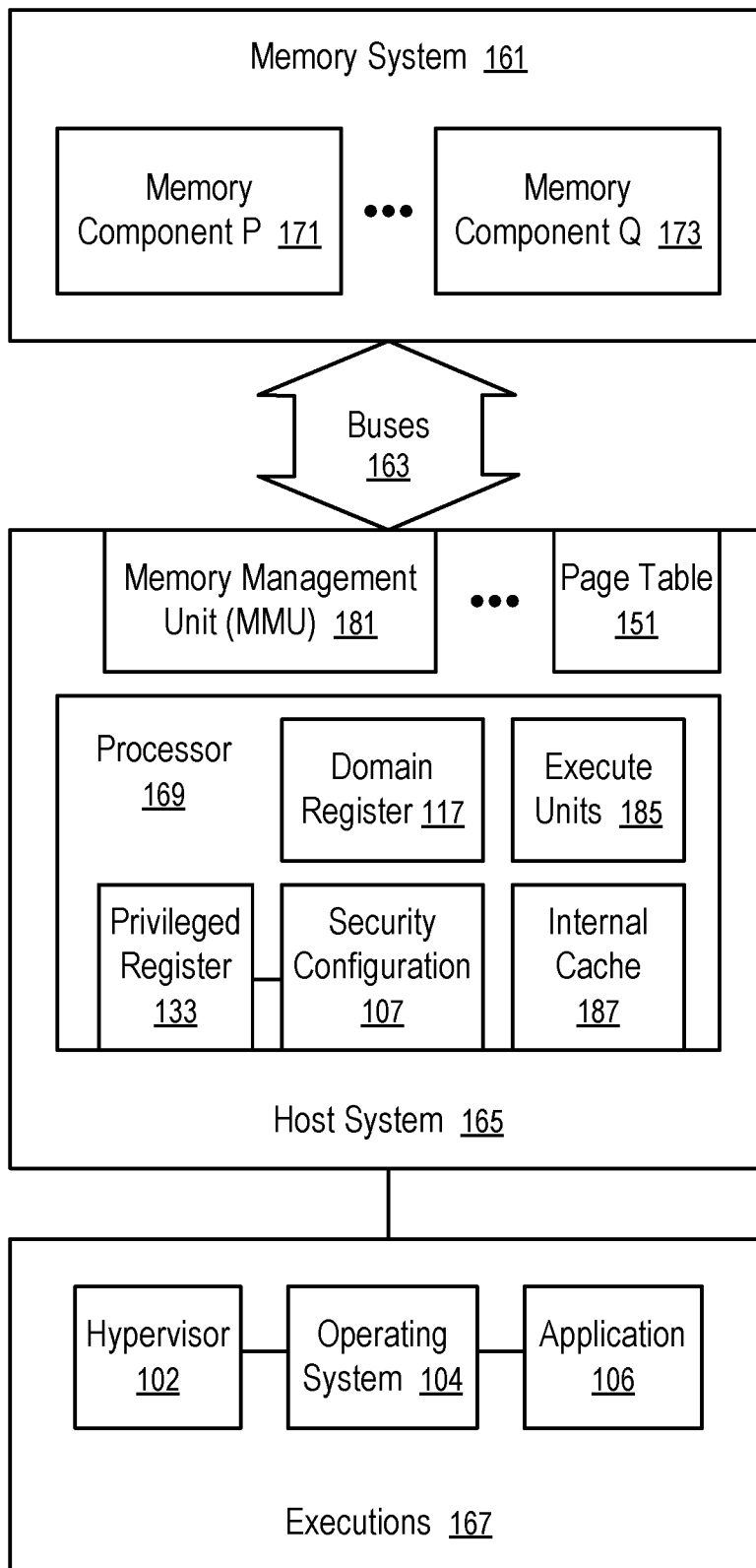
FIG. 6 shows a computer system having a domain register controlling security operations.

FIG. 6 shows a computer system having a domain register (117) controlling security operations.

For example, the computer system of FIG. 6 can optionally have a page table (e.g., 151) storing security configuration (107) for accessing memory region identified by a page table entry (153) of FIG. 5 by routines in predefined domains (101, 103, . . . , 105) illustrated in FIGS. 3 and 4. Further the computer system of FIG. 6 can optionally have the domain access tables (217, . . . , 227) of FIGS. 1 and 2 to facilitate and secure domain crossing.

For example, the computer system of FIG. 6 can have one or more permission registers storing the security configuration (107) for accessing the privileged register (133) for predefined domains (101, 103, . . . , 105) illustrated in FIGS. 3 and 4.

The domain register (117) of the processor (169) stores the identifier of the current domain (123). The content of the domain register (117) selects a set of applicable settings of the security configuration (107) corresponding to the current domain (123).

The computer system of FIG. 6 has a host system (165) coupled to a memory system (161) via one or more buses (163). The memory system (161) has memory components (171, . . . , 173).

For example, the buses (163) can include a memory bus connecting to one or more memory modules and/or include a peripheral internet connecting to one or more storage devices. Some of the memory components (171, . . . , 173) can provide random access; and the some of the memory components (171, . . . , 173) can provide persistent storage capability. Some of the memory components (171, . . . , 173) can be volatile in that when the power supply to the memory component is disconnected temporarily, the data stored in the memory component will be corrupted and/or erased. Some of the memory components (171, . . . , 173) can be non-volatile in that the memory component is capable of retaining content stored therein for an extended period of time without power.

In general, a memory system (161) can also be referred to as a memory device. An example of a memory device is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory device is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some instances, the memory device is a hybrid memory/storage system that provides both memory functions and storage functions.

The memory components (171, . . . , 173) can include any combination of the different types of non-volatile memory components and/or volatile memory components. An example of non-volatile memory components includes a negative-and (NAND) type flash memory with one or more arrays of memory cells such as single level cells (SLCs) or multi-level cells (MLCs) (e.g., triple level cells (TLCs) or quad-level cells (QLCs)). In some instances, a particular memory component can include both an SLC portion and an MLC portion of memory cells. Each of the memory cells can store one or more bits of data (e.g., data blocks) used by the host system (165). Alternatively, or in combination, a memory component (171, . . . , or 173) can include a type of volatile memory. In some instances, a memory component (171, . . . , or 173) can include, but is not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and/or a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In general, a host system (165) can utilize a memory system (161) as physical memory (109) that includes one or more memory components (171, . . . , 173). The host system (165) can load instructions from the memory system (161) for execution, provide data to be stored at the memory system (161), and request data to be retrieved from the memory system (161).

In FIG. 6, the host system (165) includes a memory management unit (MMU) (181) and a processor (169). The processor (169) has execution units (e.g., 185), such as an arithmetic-logic unit. The processor (169) has registers (183, e.g., 133) to hold instructions for execution, data as operands of instructions, and/or results of instruction executions. The processor (169) can have an internal cache (187) as a proxy of a portion of the memory system (161).

In some instances, the host system (165) can include multiple processors (e.g., 169) integrated on a same silicon die as multiple processing cores of a central processing unit (CPU).

Routines programmed for executing in the processor (169) can be initially stored in the memory system (161). The routines can include instructions for a hypervisor (102), an operating system (104), and an application (106). The routines stored initially in the memory system (161) can be loaded to the internal cache (187) and/or the registers (183, e.g., 133) for execution in the execution units (185).

The running instances of the routines form the executions (167) of the hypervisor (102), the operating system (104), and the application (106). In some instances, a hypervisor (102) is not used; and the operating system (104) controls the hardware components (e.g., the memory system (161), peripheral input/output devices, and/or network interface cards) without a hypervisor.

The executions (167) of the hypervisor (102), the operating system (104), and/or the application (106) access memory (137) (e.g., in memory components (171, . . . , 173)) using virtual memory addresses (e.g., 141) defined in one or more virtual memory spaces (e.g., 127). At least one page table (151) (e.g., as illustrated in the FIG. 5) can be used to translate the virtual memory addresses (e.g., 141) used in the execution to the physical memory addresses (e.g., 159) of the memory components (e.g., 171, . . . , 173).

As illustrated in FIG. 3, the executions of the routines of hypervisor (102), the operating system (104), and the application (106) can be organized into a plurality of domains (101, 103, . . . , 105). For each of the execution domains (101, 103, . . . , 105) and a memory region (137) identified by a page table entry (153), the page table entry (153) identifies a set (e.g., 111, 113, . . . , 115) of security configuration bits for accessing the region (137) in pre-defined types of operations such as read, write, execution, etc. The configuration bits of the corresponding security configuration (e.g., 107) controls the memory accesses of the corresponding types from a respective execution domain (e.g., 101) and/or controls the sandboxing operations for isolating calling routines (e.g., 191) and called routines (e.g., 135).

The security configuration (107) of the privileged register (133) can be stored in separate permission registers. Each of the permission registers is pre-associated with a domain (e.g., 101, 103, . . . , 105). A permission register stores a permission bit for accessing the privileged register (133) from the corresponding domain (e.g., 101, 103, . . . , or 105). Different permission bits in the permission register can be configured for different privileged registers (e.g., 133). In some instances, a privileged register (133) can have multiple permission bits in a permission register for different types of accesses (e.g., read, write, execution).

Alternatively, permission bits for the privileged register (133) can be specified in a same permission register. Further, permission bits for different privileged register (e.g., 133) can be stored in different portions of the same permission register.

Figure 7:
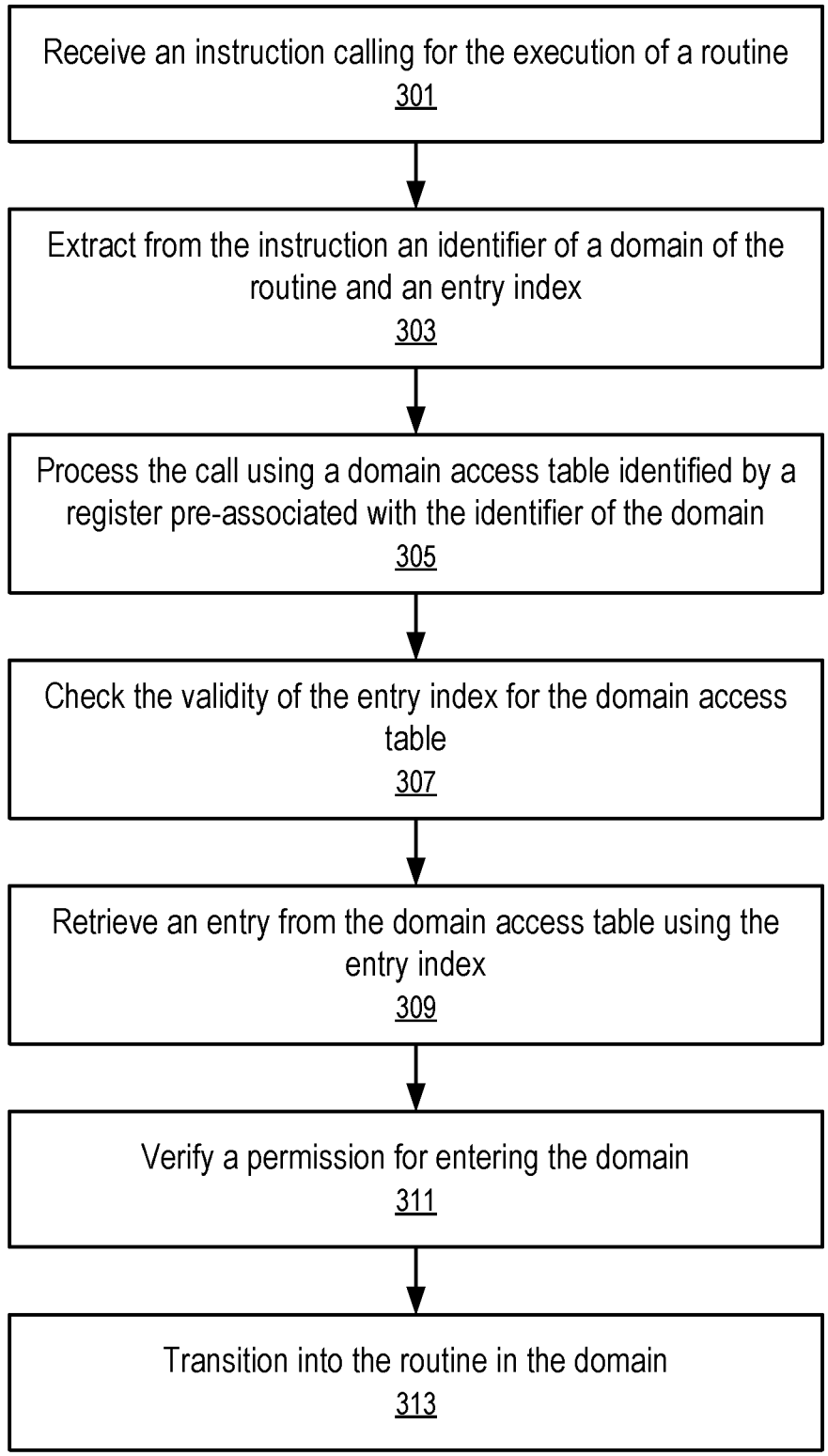
FIG. 7 shows a method to perform domain crossing in executing instructions in a computer processor.

FIG. 7 shows a method to perform domain crossing in executing instructions in a computer processor (169).

For example, the method of FIG. 7 can be performed in a computer system of FIG. 6, using domain access tables (217, . . . , 227) of FIGS. 1 and 2, a page table (151) of FIG. 5 specifying security configuration (107) of FIG. 4 for execution domains (101, 103, . . . , 105) illustrated in FIGS. 3 and 4.

At block 301, a computer processor (169) receives an instruction (193) calling for the execution of a routine (e.g., 191).

For example, the instruction (193) as illustrated in FIG. 1 can specify an identifier (197) of a domain (105) of the routine (e.g., 191) and an entry index (199) for looking up an entry in a domain access table (227) associated with the domain (105).

At block 303, the computer processor (169) extracts, from the instruction, an identifier (197) of a domain (105) of the routine (191) and an entry index (199).

At block 305, the computer processor (169) processes the call using a domain access table (227) identified by a register (229) pre-associated with the identifier (197) of the domain (105).

At block 307, the computer processor (169) checks the validity of the entry index (199) for the domain access table (227).

For example, the entry index (199) is outside of an upper bound and/or a lower bound of valid indexes for the domain access table (227) using the number of entries (221) stored in or with the domain access table (227).

At block 309, the computer processor (169) retrieves an entry (e.g., 223) from the domain access table (227) using the entry index (199), if the entry index (199) is valid.

At block 311, the computer processor (169) verifies a permission for entering the domain (105) via the entry point identified by the entry index (199).

For example, the permissions for different source domains (e.g., the domain of the instruction (193)) can be stored as part of the entry (223). Alternatively, the entry (223) can include a virtual memory address (141) of the routine (191); and the permission and/or other security option data for the routine (191) can be stored in as part of the security configuration (107) in a page table entry (153) used to convert the virtual memory address (141) to a physical memory address (159) to load the routine (193).

At block 313, the computer processor (169) transitions into the routine (193) in the domain (105).

For example, during transitioning into executing the routine (193), the computer processor (169) can update the domain register (117) by storing the domain identifier (197) of the destination domain (105) to identify the current domain (123). The current domain (123) specified in the domain register (117) control the selection of settings (e.g., 111, 113, . . . , or 115) of the security configuration (107) specified the respective domain (e.g., 101, 103, . . . , or 105) that matches with the current domain (123); and the selected settings (e.g., 111, 113, . . . , or 115) are used to control security operations during the execution of the routine (193).

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computer system, comprising:
a memory configured to store at least instructions of routines of a predefined set of domains, including a first domain and a second domain;
a plurality of domain access tables, wherein each respective domain access table in the plurality of domain access tables is pre-associated with a respective domain in the predefined set of domains, the respective domain access table having one or more entries configured to identify one or more entry points of the respective domain, wherein a domain access table pre-associated with the second domain has a count of entries; and
a processor coupled with the memory, the processor configured to transit instruction execution across the domains through entry points specified in the respective domain access table, wherein the domain access tables are configured to allow execution transitions across the domains without relying upon a predefined hierarchy of domains; and wherein in response to an instruction, executed in the first domain to request execution of a routine in the second domain, containing an entry index in the domain access table pre-associated with the second domain, the processor is further configured to perform a bound check on the entry index using the count of entries.

2. The computer system of claim 1, wherein the instruction executed in the first domain to request execution of the routine in the second domain contains an identifier of the second domain.

3. The computer system of claim 2, wherein the processor is further configured to extract the identifier of the second domain from the instruction, locate the domain access table pre-associated with the second domain, and determine whether the entry index is valid for the domain access table pre-associated with the second domain.

4. The computer system of claim 3, wherein the processor is further configured to retrieve an entry from the domain access table pre-associated with the second domain using the entry index and load the routine of the second domain using the retrieved entry.

5. The computer system of claim 4, wherein the processor is further configured to check a permission to call the routine from the first domain based at least in part on the entry retrieved using the entry index.

6. The computer system of claim 5, wherein the entry contains a permission bit specifying the permission to call the routine from the first domain.

7. The computer system of claim 5, wherein the entry contains a virtual memory address; and a page table entry for converting the virtual memory address to a physical memory address contains a permission bit specifying the permission to call the routine from the first domain.

8. The computer system of claim 5, wherein the processor comprises a domain register configured to store an identifier of the first domain during execution of the instruction.

9. The computer system of claim 8, wherein the processor is configured to update the domain register and store in the domain register the identifier of the second domain during execution of the routine in the second domain.

10. A method, comprising:
receiving, in a processor coupled with memory configured to store at least instructions of routines of a predefined set of domains, an instruction executed in a first domain, the instruction requesting execution transition into a routine in a second domain, the instruction specifying an entry index;
retrieving an entry from a domain access table among a plurality of domain access tables using the entry index, the domain access table pre-associated with the second domain and having a count of entries, wherein each respective domain access table in the plurality of domain access tables is pre-associated with a respective domain in the predefined set of domains, the respective domain access table having one or more entries configured to identify one or more entry points of the respective domain; and wherein the domain access tables are configured to allow execution transitions across the domains without relying upon a predefined hierarchy of domains; and
transiting, by the processor, instruction execution across the domains through entry points specified in the respective domain access table, including performing, in response to the instruction containing the entry index, a bound check on the entry index using the count of entries.

11. The method of claim 10, further comprising:
preventing instruction execution in a computer processor from bypassing the domain access table to transition across into the second domain from a domain different from the second domain.

12. The method of claim 10, further comprising:
extracting from the instruction an identifier of the second domain; and
selecting the domain access table using a register identified using the identifier of the second domain extracted from the instruction.

13. The method of claim 12, further comprising:
verifying a permission for entering the second domain from the first domain based at least in part on the entry retrieved from the domain access table.

14. A computer processor, comprising:
a memory configured to store at least instructions of routines of a predefined set of domains, including a first domain and a second domain;
a plurality of registers configured to store locations of a plurality of domain access tables respectively, wherein each respective domain access table in the plurality of domain access tables is pre-associated with a respective domain in a plurality of domains, the respective domain access table having one or more entries configured to identify one or more entry points of the respective domain, wherein a domain access table pre-associated with the second domain has a count of entries; and
at least one execution unit configured to execute instructions;
wherein the computer processor is configured to transit instruction execution across the domains through entry points specified in the respective domain access table, the domain access tables configured to allow execution transitions across the domains without relying upon a predefined hierarchy of domains; and
wherein in response to an instruction, executed in the first domain to request execution of a routine in the second domain, containing an entry index in the domain access table pre-associated with the second domain, the processor is further configured to perform a bound check on the entry index using the count of entries.

15. The computer processor of claim 14, further comprising:
a domain register configured to store an identifier of a domain of a routine currently being executed in the computer processor;
wherein the computer processor is configured to require the instruction causing domain crossing to specify a destination domain and configured to update the domain register in accordance with the destination domain specified in the instruction.

16. The computer processor of claim 15, further comprising:
a plurality of separate stacks configured for executions in the plurality of domains respective; and
a plurality of register value regions configured to store values of control registers for the executions in the plurality of domains respective;
wherein the control registers include at least one of a program counter (PC), a stack pointer (SP), a frame pointer (FP), an argument pointer (AP), or a processor status word (PSW), or any combination thereof.

17. The computer processor of claim 16, further configured to perform security operations in execution of instructions based at least on the identifier stored in the domain register; wherein the security operations include at least one of controlling access to a memory region based on a permission specified for a current domain identified by the domain register and a type of memory access, controlling access to a privileged register of the processor based on a permission specified for the current domain, or selectively deployment of a security mechanism to isolate resources of a calling routine and a called routine based on a permission specified for the current domain, or any combination thereof.

18. The computer processor of claim 14, wherein the predefined set of domains comprises at least one of a domain for hypervisor, a domain for operating system, or a domain for application, or any combination thereof.

* * * * *